Patented Feb. 28, 1928.

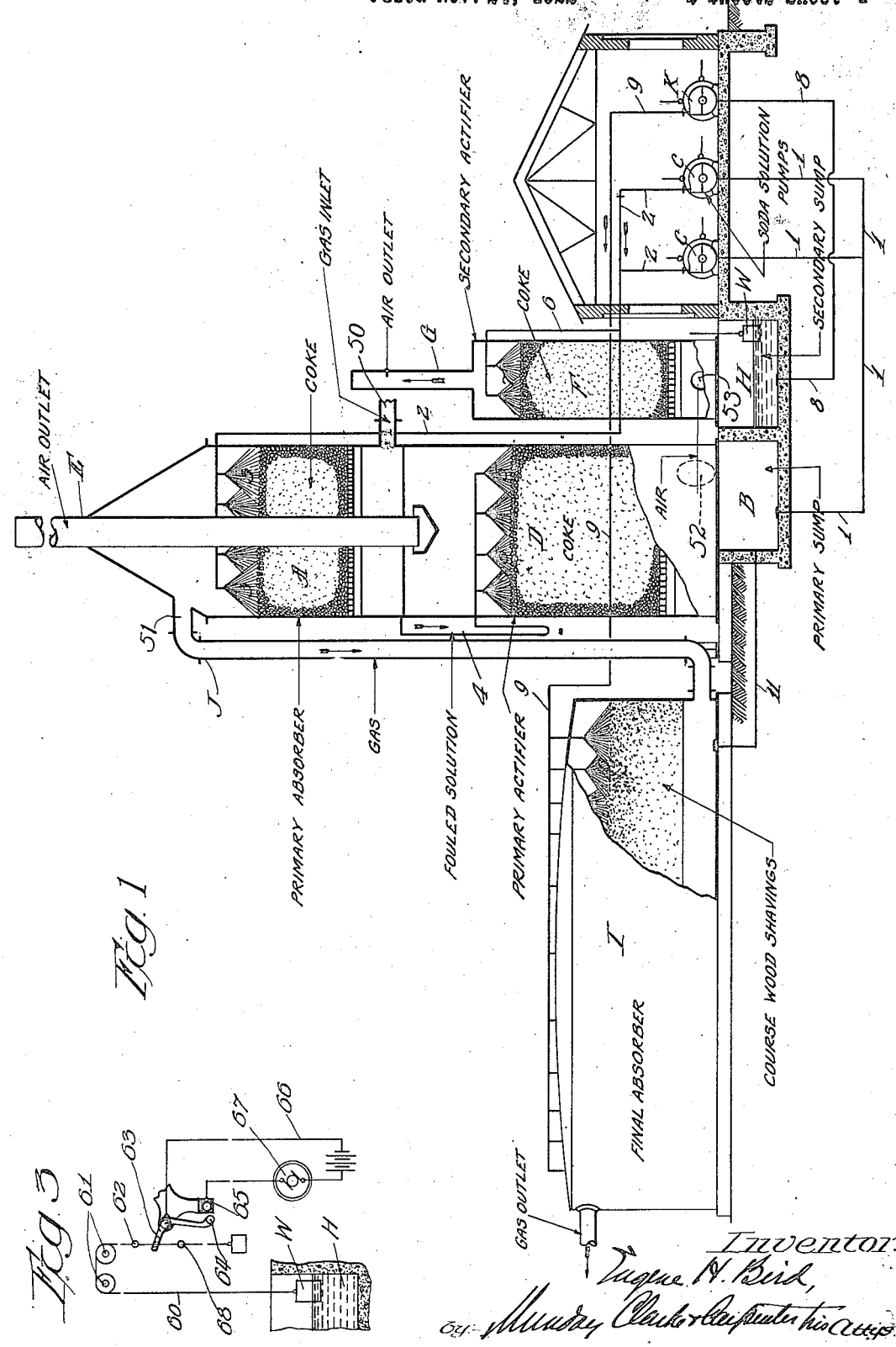

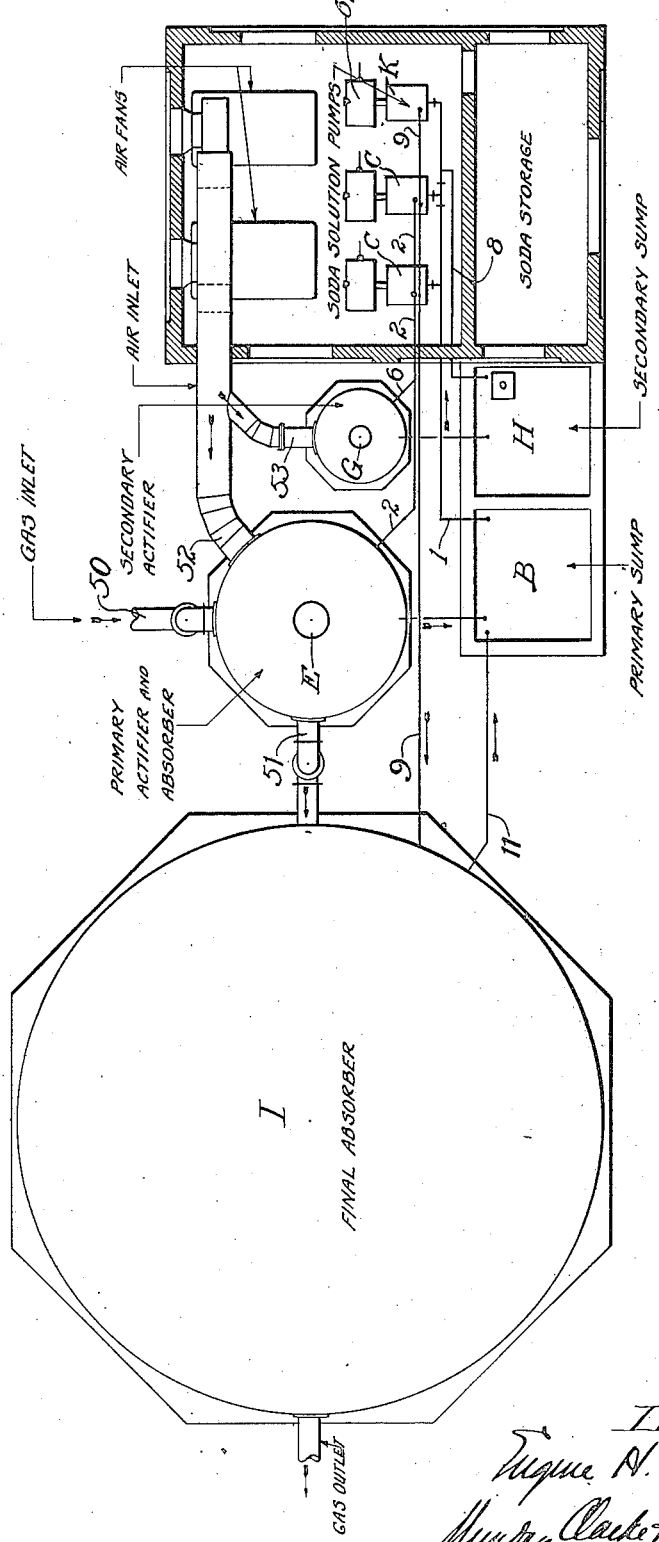

1,660,741

UNITED STATES PATENT OFFICE.

EUGENE H. BIRD, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS-PURIFICATION PROCESS AND APPARATUS.

Application filed November 24, 1922. Serial No. 603,062.

This invention relates to the removal of hydrogen sulphide and other noxious constituents, such as hydrocyanic acid, from gases containing them. An object of the invention is to provide an improved process for treating such gases, whereby not only the bulk of the hydrogen sulphide is removed but even the last traces of it, with the result that it will be found unnecessary to subject the purified gas to any iron oxide treatment.

The invention is of particular utility in connection with a gas purification process operating generally in accordance with that process described and claimed in the prior Letters Patent of the United States of David L. Jacobson, for process for purifying gases, No. 1,390,037, granted September 6, 1921. Briefly stated, such gas purification process consists in bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities and to regenerate the absorbent agent so as to render it available for further gas purification. The present invention, however, is not confined to the process just referred to, but is broadly applicable to a variety of processes based on the employment of liquid media for gas purification.

A process such as that of the above mentioned prior patent may be practiced in two essential parts of apparatus, i. e., the chamber in which the gas is brought into contact with the purifying liquid, and the chamber in which the liquid containing the absorbed impurities is regenerated. In practice the first chamber is designated as the "absorber" and the second the "actifier". These two terms will be employed in the following description.

The removal of the last traces of the hydrogen sulphide from the gas is a requirement that most gas companies must meet, being imposed by law in most places. By this invention, there is provided a process and apparatus whereby the last traces of hydrogen sulphide are removed from the gas by a system of liquid purification, complete in itself, without any resort whatever to ordinary iron oxide purification of the gas discharged from the liquid purification plant. Hydrocyanic acid is also completely removed, with resulting improvement in the quality of the gas.

In addition to the general object recited above, the invention has for further objects such other improvements or advantages in operation and results as are found to obtain in the processes and apparatus hereinafter described or claimed.

In the accompanying drawings forming a part of this specification and showing, for purposes of exemplification, a preferred form and manner in which the invention may be embodied and practiced, but without limiting the claimed invention specifically to said illustrative instances:

Figure 1 is a sectional elevation of one form of apparatus for carrying out the improved process of the invention;

Fig. 2 is a plan view of the apparatus illustrated in Fig. 1;

Fig. 3 is a diagrammatic view showing mechanism controlling intermittent pumping of regenerated solution back to the second or final absorber.

In its present embodiment, the invention is applied to the purification of coke oven gas, and, for convenience, the present description will be confined to this use of the invention. Features of the invention are, however, applicable to other useful applications, for example, to other gases. Consequently, the invention is not confined in scope to the specific use and embodiment herein described as an illustrative example.

For effecting the absorption of the sulphur compounds and other impurities from the gas, there is employed a water solution of an alkaline compound having an affinity for hydrogen sulphide. A number of the compounds of the alkali metals and alkaline earths possess this property. A solution of sodium carbonate in water is especially suitable for effecting the absorption of sulphur from the gas, because of the great affinity which a water solution of sodium carbonate has for hydrogen sulphide and because of the cheapness and availability of this sodium salt. A solution of sodium carbonate is strongly basic in its properties. When sodium carbonate dissolved in water is brought into contact with gas, such as coke oven gas, containing carbon dioxide and hydrogen sulphide. carbon dioxide is absorbed. and sodium bicarbonate is formed, as may for example, be illustrated by the following explanation:

$$Na_2CO_3 + CO_2 + H_2O = 2NaHCO_3$$

The solution of sodium carbonate will also effect the absorption from the gas of such sulphur compounds as hydrogen sulphide, $H_2S$. The absorption of hydrogen sulphide may be illustrated by the following equation:

$$Na_2CO_3 + H_2S = NaHCO_3 + NaHS$$

In applying the above to the absorption of sulphur from a gas, it is preferable to use a dilute solution of sodium carbonate in water. A concentration from about two to about five percentum of sodium carbonate will usually be found satisfactory.

The regeneration of the solution containing the absorbed impurities in the actifier may be illustrated by the following equations:

$$2NaHCO_3 = Na_2CO_3 + CO_2 + H_2O$$
$$2NaHS + CO_2 + H_2O = Na_2CO_3 + 2H_2S.$$

And also:

$$NaHCO_3 + NaHS = Na_2CO_3 + H_2S.$$

The rapid and thorough aeration greatly promotes the foregoing reactions by rapidly removing the gaseous products, as well as checking the formation of thiosulphates, and the solution gives up its hydrogen sulphide and is rejuvenated. Instead of air, another similarly inert gas may be used in the actifier.

In carrying out the invention, the gas to be purified is first passed through the primary absorber A. Here it is brought into contact with a solution of sodium carbonate, pumped from the primary sump B through pipe 1, pump C, pipe 2 and sprays 3. The impure gas enters the bottom of the primary absorber through the pipe 50, and the gas from which the bulk of the impurities have been removed discharges from the top of the primary absorber through the pipe 51. The solution containing the absorbed impurities from the bottom of the primary absorber runs through pipe 4 and is discharged by sprays 5 into the top of the primary actifier D. Here the absorbed impurities are removed by means of air blown into the bottom of the actifier, through the inlet 52. The air escapes through the stack E which is shown in this case as passing from the top of the primary actifier up through the middle of the primary absorber. The solution thus regenerated runs into primary sump B and is used over and over again.

An important feature of the invention is that the major portion of the impurities are removed from the gas in the primary absorber, and the remaining lesser portion removed by a second operation employing a correspondingly smaller bulk of liquid which has undergone a second revivification.

It has been found to be most convenient and economical to operate in such a way that approximately 90% of the hydrogen sulphide and hydrocyanic acid are removed from the gas in the primary system. Absolute purification is difficult of accomplishment in a single stage system of this sort without very greatly decreasing its capacity. When a single stage liquid purification system is employed, a little hydrogen sulphide remains in the form of alkaline hydro-sulphide in the solution going from the actifier D to the primary sump B. In order to use this solution to remove the last traces of hydrogen sulphide from the gas, in the second stage of the process, the last traces of hydrosulphides must be removed from the solution. On the other hand, since only traces of hydrogen sulphide remain in the gas passing out of the primary absorber A, only a small volume of solution will be required to furnish the alkali necessary to remove all of the hydrogen sulphide. The essential condition is that the solution thus employed for the removal of these traces from the gas be free from sulphide compounds such as exert a partial pressure with respect to hydrogen sulphide, and, as a further important condition, that the solution, in the second stage, be distributed over a very large surface to insure thorough contact with the gas. Analogous considerations apply to hydrocyanic acid and cyanide compounds.

In order, then, to remove even the last traces of hydrogen sulphide from the gas, a portion of the actified solution is withdrawn from the primary system through pipe 6 and is introduced by sprays 7 into a secondary actifier F. In usual practice, the solution thus withdrawn may be about one tenth of the volume of solution in circulation through the primary system. Air is blown into the bottom of the secondary actifier F through the inlet 53 and removes the last traces of sulphide and hydrocyanic acid compounds, from the solution. The air from the secondary actifier escapes through the outlet G. The thoroughly cleaned solution flows from the bottom of the secondary actifier into the secondary sump H. The operation of the secondary actifier may be carried on continuously, but it has been found preferable, and may be considered a feature of the invention, to deliver the portion of the liquid which has been subjected to further revivification, from the secondary sump H intermittently to the secondary or final absorber, where the gas from the primary absorber continuously passes into contact with the said liquid. Intermittent pumping of the solution to the final absorber is preferable for the reason that much better distribution of the solution over the material in the final absorber can be obtained by pumping a large volume in a short time than by pumping a small volume continuously.

The apparatus for removing the last traces of hydrogen sulphide includes the final absorber I which contains a bed of non-reacting solid material, for example, coarse wood shavings, coke breeze or other suitable material offering relatively large surfaces and capable of holding a considerable amount of liquid by adhesion. In practice there has been used a final absorber filled with shavings, capable of holding sufficient solution to remove the last traces of hydrogen sulphide from the gas for a period of three hours. The active surfaces of the secondary absorber are of substantially greater area than those of the primary absorber.

The gas passes from the primary absorber A through pipe J into the bottom of the final absorber I. When the second sump H is full a float W on this sump automatically starts the secondary pump K which pumps the clean solution through pipes 8 and 9 and sprays 10, drenching the material in the final absorber and washing out any fouled solution. This fouled solution runs through pipe 11 into primary sump B. The actual time of pumping may be varied considerably, but in practice, it ordinarily takes from 10 to 20 minutes to empty the secondary sump. The pump K then automatically stops and may not be started again until the sump H is refilled.

A form of apparatus controlling the intermittent pumping of the solution from the sump H to the final absorber I is shown diagrammatically in Fig. 3. The float W in the sump H is suspended from a flexible rope or cord 60 which runs over supporting pulleys 61. When the liquid in said sump rises to a predetermined high level, the operating lug 62 on the rope 60 moves the pivoted switch arm 63 to cause the movable contact member 64 to engage the fixed contact member 65 and close the motor circuit 66 of the motor 67 which operates the pump K. But, when the liquid in the said sump falls to a predetermined low level, the lowering of the float W will cause the lug 68 to rise and move the arm 63 to break the motor circuit. Until such predetermined low level is attained, however, the contact will remain in circuit closing position.

Besides the great advantage obtained by completely eliminating oxide purification, it has been found possible by this invention to reduce greatly the size of the apparatus necessary for removing the last traces of hydrogen sulphide. A reduction of 50% or more has been effected in this respect. Any soda which it is necessary to add to the system to replenish losses, is preferably added to the solution in the secondary sump so that the fresh soda will always be used first to remove the last traces of hydrogen sulphide from the gas.

The invention as hereinabove set forth may be variously embodied within the scope of the claims hereinafter made.

I claim:

1. The process of purifying gases which consists in: passing the gas into contact with a relatively large volume of alkaline absorbent agent to absorb the bulk of the hydrogen sulphide impurities from the gas, then passing the thus purified gas into contact with a relatively smaller volume of alkaline absorbent agent to absorb the residue of hydrogen sulphide from the gas; subjecting the absorbent agent discharged from the first absorption stage to aeration to remove the absorbed impurities commingling the absorbent agent discharged from the second absorption stage with the aerated solution from the first absorption stage; withdrawing part of the solution from the thus commingled bulk and subjecting such withdrawn part to individual aeration; intermittently recirculating the solution from the last mentioned aeration stage back to the second absorption stage; and continuously recirculating the remainder of the solution from the first mentioned aeration stage back to the primary absorption stage; substantially as specified.

2. The process of purifying gases which consists in: passing the gas into contact with a relatively large volume of sodium carbonate solution to absorb the bulk of the hydrogen sulphide impurities from the gas, then passing the thus purified gas into contact with a relatively smaller volume of sodium carbonate solution to absorb the residue of hydrogen sulphide from the gas; subjecting the solution discharged from the first absorption stage to aeration to remove the absorbed impurities, commingling the solution discharged from the second absorption stage with the aerated solution from the first absorption stage; withdrawing part of the solution from the thus commingled bulk and subjecting such withdrawn part to individual aeration; intermittently recirculating the solution from the last mentioned aeration stage back to the second absorption stage; and continuously recirculating the remainder of the solution from the first mentioned aeration stage back to the primary absorption stage; substantially as specified.

3. The process of purifying gases which consists in: passing the gas into contact with a relatively large volume of alkaline liquid absorbent agent to absorb the bulk of the hydrogen sulphide impurities from the gas, then passing the thus purified gas into contact with a relatively smaller volume of alkaline liquid absorbent agent distributed over a relatively large area to absorb the residue of hydrogen sulphide from the gas; substantially as specified.

4. The process of purifying gases which consists in: passing the gas into contact with a relatively large volume of sodium carbonate solution to absorb the bulk of the hydrogen sulphide impurities from the gas, then passing the thus purified gas into contact with a relatively smaller volume of sodium carbonate absorbent solution distributed over a relatively large area to absorb the residue of hydrogen sulphide from the gas; substantially as specified.

5. The process of purifying gases, which consists in: passing the gas through non-reacting solid material drenched with a solution reactive to the impurities in the gas, discharging the solution from the non-reacting material, regenerating it, and intermittently drenching the non-reacting material with the regenerated solution; substantially as specified.

6. The process of purifying gases, which consists in: passing the gas through non-reacting solid material drenched with a solution reactive to the impurities in the gas, discharging the solution from the non-reacting material, aerating it, and intermittently drenching the non-reacting material with the aerated solution; substantially as specified.

7. The process of removing hydrogen sulphide constituents from gases, which consists in: passing the gas through non-reacting solid material drenched with a solution reactive to the hydrogen sulphide impurities in the gas, discharging the solution, regenerating it, and intermittently drenching the non-reacting material with the regenerated solution; substantially as specified.

8. The process of purifying gases, which consists in: passing the gas through a mass of non-reacting solid inert material drenched with and holding for a considerable period of time a solution reactive to the impurities in the gas, discharging the solution from the non-reacting material, regenerating it, and drenching the non-reacting material with the regenerated solution; substantially as specified.

9. The process of removing hydrogen sulphide constituents from gases, which consists in: passing the gas through a mass of non-reacting solid inert material drenched with and holding for a considerable period of time a solution reactive to the hydrogen sulphide impurities in the gas, discharging the solution, regenerating it, and drenching the non-reacting material with the regenerated solution; substantially as specified.

10. The process of purifying gases, which consists in: subjecting the gas to a primary absorption stage in which the gas is brought into contact with a solution reactive to the hydrogen sulphide impurities in the gas to remove the bulk of such impurities from the gas, and then passing the gas through non-reacting solid material drenched with a solution reactive to such impurities to remove the residue of the impurities from the gas; substantially as specified.

11. The process of purifying gases, which consists in: passing the gas through non-reacting solid material drenched with a sodium carbonate solution to remove the hydrogen sulphide impurities from the gas; substantially as specified.

12. In a process for the purification of gas by circulating a liquid absorbent agent continuously through a gas purification stage and a regeneration stage, the combination of steps which consists in: withdrawing a portion of the liquid from the regeneration stage, subjecting it to further regeneration and bringing it into contact with the gas from the gas purification stage to remove the last traces of impurities; substantially as specified.

13. In a process for the purification of gas by circulating a liquid absorbent agent continuously through a gas purification stage and a regeneration stage, the combination of steps which consists in: withdrawing a portion of the liquid from the regeneration stage, subjecting it to further regeneration, and pumping the further regenerated portion intermittently over non-reacting solid material in contact with the gas continuously passing from the purification stage; substantially as specified.

14. In a process for the purification of gas by circulating a liquid absorbent agent continuously through a gas purification stage and an aeration stage, the combination of steps which consists in: withdrawing a portion of the liquid from the aeration stage, subjecting it to further aeration and bringing it into contact with the gas from the gas purification stage to remove the last traces of impurities; substantially as specified.

15. In a process for the purification of gas by circulating a liquid absorbent agent continuously through a gas purification stage and an aeration stage, the combination of steps which consists in: withdrawing a portion of the liquid from the aeration stage, subjecting it to further aeration, and pumping the further aerated portion intermittently over non-reacting solid material in contact with the gas continuously passing from the purification stage; substantially as specified.

16. In a process for the purification of gas by circulating a sodium carbonate solution continuously through a gas purification stage and a regeneration stage, the combination of steps which consists in: withdrawing a portion of the liquid from the regeneration stage, subjecting it to further regeneration and bringing it into contact with the gas from the gas purification stage to remove the last traces of impurities; substantially as specified.

17. The process for the purification of gas consisting in continuously passing the gas in a primary purification stage through an alkaline absorbent agent, continuously discharging the absorbent agent containing the absorbed impurities and subjecting it to aeration to remove the absorbed impurities, continuously circulating the regenerated absorbent agent back to the primary purification stage, withdrawing a portion of the liquid from the aeration stage, treating it to remove the last traces of impurities, and bringing it into contact with the gas from the primary purification stage; substantially as specified.

18. Apparatus for purifying gases, embodying: a primary absorber, a primary actifier, a secondary absorber and a secondary actifier, means for withdrawing solution from the primary actifier and passing it over the secondary actifier, and means for pumping the solution from the secondary actifier over the secondary absorber; substantially as specified.

19. Apparatus for purifying gases, embodying: a primary absorber, a primary actifier, a secondary absorber, and a secondary actifier having a bed of non-reacting solid material, means for withdrawing solution from the primary actifier and passing it over the secondary actifier, and means for pumping the solution from the secondary actifier over the secondary absorber; substantially as specified.

20. Gas purification apparatus, embodying: an absorber filled with non-reacting solid material, a sump, an aerating tower connected with said sump, means for pumping solution from the absorber over the aerating tower, and means intermittently pumping the aerated solution from the sump and distributing it over the material in the absorber; substantially as specified.

21. Gas purification apparatus embodying: an absorber filled with non-reacting solid material, a sump, an aerating tower connected with said sump, means for pumping solution from the absorber over the aerating tower, and means, automatically responsive to variations in the level of the solution in the sump, for intermittently pumping the aerated solution from the sump and distributing it over the material in the absorber; substantially as specified.

22. In a process of purifying gases that involves passing the gas in contact with a liquid absorbent agent in a gas purification stage, discharging spent liquid from the gas purification stage, revivifying spent liquid discharged from the gas purification stage, and recirculating revivified liquid to a gas purification stage, the improvement which comprises intensively actifying a portion only of the spent liquid that is discharged from the gas purification stage.

In testimony whereof I have hereunto set my hand.

EUGENE H. BIRD.